(12) United States Patent
Addy et al.

(10) Patent No.: US 9,805,133 B2
(45) Date of Patent: Oct. 31, 2017

(54) SYSTEM AND METHOD OF ENHANCING CONSUMER ABILITY TO OBTAIN INFORMATION VIA BAR CODES

(71) Applicant: Honeywell International Inc., Morristown, NJ (US)

(72) Inventors: Kenneth L. Addy, Massapequa, NY (US); Jaime E. Barahona, Hempstead, NY (US); Albert Lee, Brooklyn, NY (US); Howard Yuk, East Meadow, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/208,935

(22) Filed: Jul. 13, 2016

(65) Prior Publication Data

US 2016/0321374 A1    Nov. 3, 2016

Related U.S. Application Data

(63) Continuation of application No. 13/270,264, filed on Oct. 11, 2011, now Pat. No. 9,430,575.

(51) Int. Cl.
*G06F 17/30* (2006.01)
*G06K 7/10* (2006.01)

(52) U.S. Cl.
CPC ... *G06F 17/30879* (2013.01); *G06K 7/10722* (2013.01)

(58) Field of Classification Search
CPC .................................................. G06F 17/30879

USPC .............................. 235/375; 705/14.4, 14.73
See application file for complete search history.

(56) References Cited

U.S. PATENT DOCUMENTS

| 6,475,146 | B1 * | 11/2002 | Frelburger ........... A61B 5/0002 |
|---|---|---|---|
| | | | 600/437 |
| 7,337,968 | B2 | 3/2008 | Wilz, Sr. et al. |
| 2004/0122771 | A1 | 6/2004 | Celi, Jr. et al. |
| 2008/0203167 | A1 | 8/2008 | Soule et al. |
| 2010/0225653 | A1 | 9/2010 | Sao et al. |
| 2012/0026530 | A1 | 2/2012 | Tsongas et al. |
| 2012/0128267 | A1 | 5/2012 | Dugan et al. |
| 2012/0187187 | A1 | 7/2012 | Duff et al. |
| 2012/0222081 | A1 | 8/2012 | Schaefer et al. |
| 2012/0295591 | A1 | 11/2012 | Boudville |

(Continued)

*Primary Examiner* — Toan Ly
(74) *Attorney, Agent, or Firm* — Husch Blackwell LLP

(57) ABSTRACT

Systems and methods of a portable communications device and a product exchanging direct commands or requests via bar codes to address a condition of the product are provided. Some methods can include the portable communications device scanning a bar code displayed on the product and generating and displaying a bar code to be scanned by the product, wherein the bar codes represent direct commands or requests to be executed by the portable communications device or the product to address the condition of the product. Additionally or alternatively, some methods can include the product scanning a bar code displayed on the portable communications device and generating and displaying a bar code to be scanned by the portable communications device, wherein the bar codes represent direct commands or requests to be executed by the product or the portable communications device to address the condition of the product.

19 Claims, 1 Drawing Sheet

(56) References Cited

U.S. PATENT DOCUMENTS

2013/0026217 A1  1/2013  Boudville
2013/0069794 A1  3/2013  Terwilliger et al.

* cited by examiner

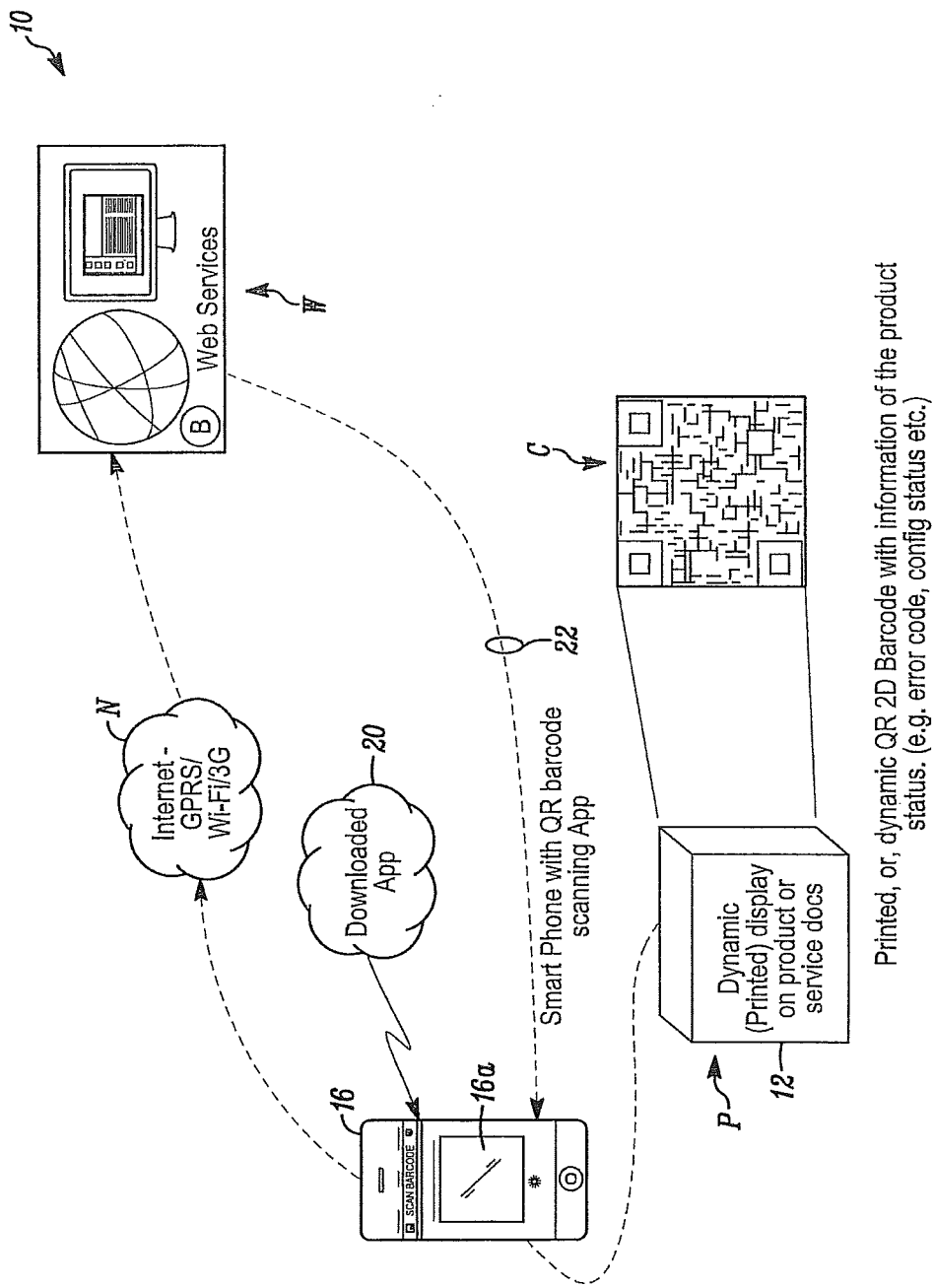

SYSTEM AND METHOD OF ENHANCING CONSUMER ABILITY TO OBTAIN INFORMATION VIA BAR CODES

CROSS-REFERENCE TO RELATED APPLICATIONS

This application is a continuation of and claims the benefit of the filing date of U.S. application Ser. No. 13/270,264 filed Oct. 11, 2011.

FIELD

The application pertains to systems and methods of providing information to customers or users in connection with products or services via bar codes. More particularly, the application pertains to such systems and methods where bar codes can function as information retrieval facilitators, when scanned, to provide selected information to customers or users for troubleshooting, installation, or other purposes.

BACKGROUND

Appliances or other types of equipment found in homes or residences are increasingly complex to install and to maintain. Installation manuals and fault finding manuals for modern electronics systems are complicated and verbose. Large displays are, at times, needed to show detailed error messages, and these are expensive and add complexity to equipment. Many types of equipment found in homes or residences have relatively small displays.

Examples of such electronics equipment include HVAC systems, home entertainment, white goods, life safety devices, or residential or commercial security systems. In all cases, this kind of equipment is increasingly complex to install, maintain, and repair.

For example, home automation systems, at times, lack adequate customer service capabilities when there is a problem with the system or the customer needs to be in contact with a representative. Because of resource constraints, such as system cost, memory, and processing power, a typical home automation system may only annunciate basic codes or texts to indicate any trouble conditions.

The customer would then have to search through the system manual or call customer support to get more information and instructions to rectify the problem. Depending on business cost constraints, the central station may take a while to respond to the customer's call or to dispatch a service technician.

In general, residential electronics systems, at times, lack a convenient method for the customer and the technical assistance team to be in contact for support. For example, there is not a quicker way for the customer to reach a representative other than to call using a phone or to turn on the customer's computer and use a web site.

BRIEF DESCRIPTION OF THE DRAWING

FIG. 1 is a diagram illustrating aspects of a system and method in accordance herewith.

DETAILED DESCRIPTION

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Embodiments hereof can take advantage of the fact that most electronics devices used in a home or residence have a display of some kind, e.g. a security system has a display for the home owner to control the security system. A refrigerator might have a two digit LED display to show an error code, which subsequently has to be researched on-line or in a verbose and often confusing paper manual. Alternately, these existing displays can be used to display barcodes, e.g. QR codes, which are relatively simple to display on a small low cost display. It is also possible to print QR codes as stickers, which can be attached to various types of equipment.

In one aspect, barcodes can be used to facilitate the delivery of various types of product or service related information to customers or users. Barcodes, such as the QR-code and data matrix, can store substantial amounts of information in a small footprint. Information, such as a URL, text, phone numbers, and SMS, can be embedded into a barcode. It will be understood that the details of any specific bar code are not limitations hereof.

To scan the barcode, a customer can execute an application on a portable communications device, such as a smart phone. The user or customer points a camera at the barcode (irrespective of being presented on a display or as a printed element). Depending on how the barcode has been formatted, the application can display the embedded text information or automatically connect to a web site.

Alternately, the codes can be used to display/download web pages to a tablet computer, smart phone, or equivalent portable communications device to lead a home owner or technician through an installation process, configuration, and subsequently, when a product is in service, to review error messages and fault finding information.

In another aspect, the barcodes can include contact information for the system, such as account number, IP MACID, WiFi MACID, GSM MACID, model, version, etc. In one embodiment, when a product or system is exhibiting a trouble condition, a barcode can be displayed on a console's screen. The customer can scan the barcode via a smart phone or equivalent device and be directed to a server that can present a video with information on how to fix the problem. This will save the customer's time in not needing to call technical support.

Alternately, the customer can also scan a barcode sticker and be connected to a web site to pay bills or request service. Where the product/service relates to a security monitoring system and where a representative needs to contact the customer, a central station can generate a barcode and transmit it to the local system's keypad screen. The customer will then scan it, and the smart phone's application will either translate it to a readable format or load a web site with more information.

Hence, the displayed bar or QR code can be linked via a smart phone with a camera or an equivalent device to a website with comprehensive fault-finding and error checking information. Advantageously, in the case of a security system, there is always a small display that could display a bar or QR code.

In summary, in one embodiment, an end user can use a smart phone or equivalent device that includes a downloaded application to issue a connect request to a web service by scanning a barcode defined for the relevant product/service being used, installed, or repaired. The bar code is presented on a small display device on the product or is displayed as a pre-printed tag attached to the product or to physical material associated with a particular service.

Based on the bar coded input, a web service parses the input information and returns other information to the phone user, which can then facilitate taking additional, appropriate steps relative to the product/service.

Multiple bar codes can be sequentially displayed or presented as a pre-printed sequence to the user. The web service can send detailed step-by-step instructions as the end-user scans each code that is displayed.

FIG. 1 illustrates a system 10 for providing bar code facilitated information to a user or customer of/for a product P or a service of interest. In one embodiment, the product P can carry an electronic display 12 driven by a local computer. A bar code, for example, a bar code C, can be presented on the display. Alternately, an appropriate bar code can be preprinted on a label or substrate and attached to the product P or materials associated with a service of interest.

Irrespective of form, a communications product, such as a smart phone, an equivalent-type product, or a pad computer, indicated at 16, with a camera and scanning software (which could be downloaded wirelessly as an executable application, indicated at 20), can be used to scan the barcode C. The scanned image can be presented on a display of the device 16, as at 16a.

Some or all of the information on the bar code C can be extracted, via the downloaded application, and forwarded, via one or more computer networks N, to a web server W, which can be a source of services and information as to the product P or the services of interest. In response to the information provided by the device 16 and code C, the server W can extract, parse, and return relevant information to the device 16, as at 22.

The user can view the information presented on a display on the device 16, as at 16a, and take appropriate action. It will be understood that a sequence of bar codes, such as the code C, can be presented by the user via the display 12 or in pre-printed form to the server W which, in turn, can provide a sequence of appropriate, responsive information.

In summary, the present system and method provides an electronics system that can be installed, configured, and maintained by end users in easy steps to address the issues with increasingly complex equipment found in homes and offices.

In the system, step by step instructions can easily be fed to a smart phone or equivalent device using dynamic QR codes presented on a small, low cost equipment display or pre-printed on a substrate. The cost of repair and installation can, as a result, be reduced since a professional installer is not always required to install and maintain the system.

Operationally, the user scans the bar code using a smart phone that automatically connects to a web service and guides the repair, configuration, etc. process. In the process, in one embodiment, the user can capture the QR code using a smart phone's camera.

In yet other embodiments, the product P can present barcode links for training or troubleshooting videos. A remote site can push barcode links to coupon offers. Alternately, a remote site can push barcode links for reminders or messages.

The bar code can contain a link to the product P for configuration purposes. Further, the user interface can be decoupled. The product may contain a web server to drive the content of the display 12 for the scanning device 16. Then, the scanning device 16 can access, modify, and push the configuration data back onto the product P. If the product P does not have a web server, the user interface may also be presented by the remote server W for the scanning device 16. The configuration data can then be pushed to the server W, which will eventually be relayed into the product P.

In yet another embodiment, the product P can contain a camera and barcode processing software to further decouple the user interface. If the scanning device 16 has the ability to generate barcodes, then the product P can then take commands directly from the scanning device 16. Effectively, the product P and the scanning device 16 will be exchanging direct commands and requests through barcodes. The bar code links can also be used in a guard tour mode where a guard can obtain information or a procedure on what to do if something out of the ordinary has occurred.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the FIGURES do not require the particular order shown or sequential order to achieve desirable results. Other steps may be provided, or steps may be eliminated from the described flows, and other components may be added to or removed from the described embodiments.

The invention claimed is:

1. A method comprising:
a portable communications device scanning a first bar code displayed on a product device, a display screen of the product device, or a sticker or a tag affixed to the product device, the first bar code representing a first direct command or a first request to be executed by the portable communications device to address a condition of the product device; and
the portable communications device generating and displaying a second bar code to be scanned by the product device, the second bar code representing a second direct command or a second request to be executed by the product device to address the condition of the product device.

2. The method of claim 1 further comprising a camera of the portable communications device scanning the first bar code displayed on the product device.

3. The method of claim 1 further comprising displaying text associated with the first direct command or the first request on the portable communications device.

4. The method of claim 1 wherein the first direct command or the first request includes the portable communications device connecting to a website or downloading or displaying one or more pages, one or more videos, or relevant information from the website.

5. The method of claim 1 further comprising:
the portable communications device executing the first direct command or the first request; and
responsive to the portable communications device executing the first direct command or the first request, the portable communications device generating and displaying the second bar code.

6. A method comprising:
a product device scanning a first bar code displayed on a portable communications device, the first bar code representing a first direct command or a first request to be executed by the product device to address a condition of the product device; and the product device generating and displaying a second bar code to be scanned by the portable communications device, the second bar code representing a second direct command or a second request to be executed by the portable communications device to address the condition of the product device.

7. The method of claim 6 further comprising a camera of the product device scanning the first bar code displayed on the portable communications device.

8. The method of claim 6 further comprising the product device displaying the second bar code on a display screen of the product device.

9. The method of claim 8 further comprising displaying text associated with the first direct command or the first request on the display screen of the product device.

10. The method of claim 6 wherein the first direct command or the first request includes the product device connecting to a website or downloading or displaying one or more pages, one or more videos, or relevant information from the website.

11. The method of claim 6 further comprising:
the product device executing the first direct command or the first request; and
responsive to the product device executing the first direct command or the first request, the product device generating and displaying the second bar code.

12. A portable communications device comprising:
a camera;
a user interface device;
a programmable processor; and
executable control software stored on a non-transitory computer readable medium,
wherein the camera scans a first bar code displayed on a product device, a display screen of the product device, or a sticker or a tag affixed to the product device,
wherein the first bar code represents a first direct command or a first request to be executed by the programmable processor and the executable control software to address a condition of the product device,
wherein the programmable processor and the executable control software generate a second bar code and cause the second bar code to be displayed on the user interface device for scanning by the product device, and
wherein the second bar code represents a second direct command or a second request to be executed by the product device to address the condition of the product device.

13. The portable communications device of claim 12 wherein the programmable processor and the executable control software cause text associated with the first direct command or the first request to be displayed on the user interface device.

14. The portable communications device of claim 12 further comprising:
a transceiver device,
wherein, responsive to the first direct command or the first request, the programmable processor and the executable control software cause the transceiver device to connect to a website and download, via the transceiver device, one or more pages, one or more videos, or relevant information from the website and cause the one or more pages, the one or more videos, or the relevant information to be displayed on the user interface device.

15. The portable communications device of claim 12 wherein the programmable processor and the executable control software execute the first direct command or the first request, and wherein the programmable processor and the executable control software generate the second bar code responsive to executing the first direct command or the first request.

16. A product device comprising:
a camera;
a user interface device;
a programmable processor; and
executable control software stored on a non-transitory computer readable medium,
wherein the camera scans a first bar code displayed on a portable communications device,
wherein the first bar code represents a first direct command or a first request to be executed by the programmable processor and the executable control software to address a condition of the product device,
wherein the programmable processor and the executable control software generate a second bar code and cause the second bar code to be displayed on the user interface device for scanning by the portable communications device, and
wherein the second bar code represents a second direct command or a second request to be executed by the portable communications device to address the condition of the product device.

17. The product device of claim 16 wherein the programmable processor and the executable control software cause text associated with the first direct command or the first request to be displayed on the user interface device.

18. The product device of claim 16 further comprising:
a transceiver device;
wherein, responsive to the first direct command or the first request, the programmable processor and the executable control software cause the transceiver device to connect to a website and download, via the transceiver device, one or more pages, one or more videos, or relevant information from the website and cause the one or more pages, the one or more videos, or the relevant information to be displayed on the user interface device.

19. The product device of claim 16 wherein the programmable processor and the executable control software execute the first direct command or the first request, and wherein the programmable processor and the executable control software generate the second bar code responsive to executing the first direct command or the first request.

* * * * *